(12) United States Patent
Bates et al.

(10) Patent No.: US 6,983,454 B2
(45) Date of Patent: Jan. 3, 2006

(54) EXTENDED "RUN TO" FUNCTION

(75) Inventors: Cary Lee Bates, Rochester, MN (US); Steven Gene Halverson, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 650 days.

(21) Appl. No.: 10/113,371

(22) Filed: Mar. 29, 2002

(65) Prior Publication Data
US 2003/0188225 A1 Oct. 2, 2003

(51) Int. Cl.
G06F 9/44 (2006.01)

(52) U.S. Cl. .................. 717/129; 717/125; 714/35; 714/46

(58) Field of Classification Search .............. 717/129, 717/124–135; 714/34–35, 38, 46; 700/26, 700/17; 703/23, 28
See application file for complete search history.

(56) References Cited

U.S. PATENT DOCUMENTS 5,835,699 A * 11/1998 Kimura ................. 714/34
5,845,125 A * 12/1998 Nishimura et al. ......... 717/129
5,889,981 A * 3/1999 Betker et al. ............... 712/227
5,896,536 A * 4/1999 Lindsey ...................... 717/128
6,427,232 B1 * 7/2002 Ku et al. .................... 717/124
6,463,553 B1 * 10/2002 Edwards ..................... 714/38
6,463,578 B1 * 10/2002 Johnson ..................... 717/124
6,516,408 B1 * 2/2003 Abiko et al. ................ 712/227
6,587,967 B1 * 7/2003 Bates et al. .................. 714/35
6,643,769 B1 * 11/2003 Huck et al. ................. 712/227
6,658,649 B1 * 12/2003 Bates et al. ................. 717/124
2003/0115576 A1 * 6/2003 Bates et al. ................. 717/129
2004/0226003 A1 * 11/2004 Bates et al. ................. 717/129

* cited by examiner

Primary Examiner—Antony Nguyen-Ba
(74) Attorney, Agent, or Firm—Moser, Patterson & Sheridan, LLP

(57) ABSTRACT

Methods, apparatus and articles of manufacture for implementing an extended run-to function for a selected code portion are provided. One embodiment provides a method of debugging code using a debugging program. The method comprises, for a plurality of user-selected statements of the code, automatically setting breakpoints on each of the plurality of user-selected statements; executing the code until a breakpoint set on a first encountered statement of the plurality of user-selected statements is encountered and fired; halting execution at the breakpoint; and displaying a position at which execution halted via a user interface.

20 Claims, 8 Drawing Sheets

FIG. 4 iSeries System Debugger

File Edit Debug Breakpoint Actions Window Help

Programs | Breakpoints

Programs
/Qsys.lib/Carytest.lib/Aa.pgm
　Aa
　Aa_1
Service Programs
Class Files

402

/Qsys.lib/Carytest.lib/Aa.pgm/Aa        Default ▶

```
1  #include <stdio.h>
2  void fol(void);
3  main()
4  {
5      double x,y;
6      float  z;
7      fol();
8      z = 99999.9;
9      x = 99999.9;
10     y = 99999.9;
11     if (z>8765)
12         z=12.2;
13     else
14         y=87.2
15     w=y* z;
16     foo(z);
17     pow(x,y);
18     display(x);
19     x=0;
```

404

406

408

Add Breakpoint
　Enable Breakpoint
　Disable Breakpoint
　Remove Breakpoint
　Remove All Breakpoints
　Breakpoint Properties
　Pause
　Resume
　Step Over
　Step Over Skip Breakpoints
　Step Into
　Run To
　Run To Cursor
　Run To Cursor Skip Breakpoints
　New Monitor
　Find
　Go To Line...
　Change Source View
　Help

400

Breakpoint Removed from Line: 8

| BREAKPOINT TABLE | | |
| --- | --- | --- |
| ADDRESS /502 | OPCODE /504 | EXTENDED RUN TO FLAG /506 |
| 23453 | LOAD CONSTANT | ON |
| 23581 | STORE | ON |
| 27578 | LOAD | OFF |

FIG. 5

EXTENDED "RUN TO" FUNCTION

BACKGROUND OF THE INVENTION

1. Field of the Invention

The present invention generally relates to data processing and more particularly to debugging code.

2. Description of the Related Art

A programmer develops a software program by producing and entering source code into files using a text editor program. The computer then creates an executable program by translating the source code into machine code. The machine code is the rudimentary instructions understood by a computer. Illustratively, the foregoing software development process is accomplished by running a series of programs. These programs typically include a compiler for translating the source code into machine code and a linker to link the machine code together to form a program.

When developing computer software, it is necessary to perform a function termed "debugging". Debugging involves testing and evaluating the software to find and correct any errors and improper logic operation. An effective debugger program is necessary for rapid and efficient development of software and typically provides functions including breakpoints, run-to-cursor, step into, step over and the like.

The run-to-cursor function allows a user to place a cursor on a selected statement and then execute the program from a current stopped position to the cursor. When execution reaches the line at which the cursor is located, the debugger gains control. In this way, the user may observe the effects of running the portion of code from the current stopped position to the cursor position. If unexpected results are identified, the user has successfully located the source of a problem and may then take remedial steps to correct the problem.

While the run-to-cursor function provides some advantages in identifying problems in the code, it is limited in that a user is limited to specifying only a particular line number to run to. To illustrate the limitation, consider, for example, a user desiring to halt execution on a particular module of a program. In this case, the run-to-cursor function is not capable of producing the desired result because the execution path may not be known and, therefore, the entry point to the module from the current stopped position is not known. Instead, the user must manually identify the program containing the module, identify the module within the program, identify each routine and then set a breakpoint on each entry point to each routine of the code (or set a breakpoint on each statement of the code). Such an approach is burdensome and error prone.

Therefore, there is a need for a method, article of manufacture and system in which execution proceeds to a specified code portion.

SUMMARY OF THE INVENTION

The present invention provides methods, apparatus and articles of manufacture for implementing a run-to function for a selected code portion.

One embodiment provides a method of debugging code using a debugging program. The method comprises, for a plurality of user-selected statements of the code, automatically setting breakpoints on each of the plurality of user-selected statements; executing the code until a breakpoint set on a first encountered statement of the plurality of user-selected statements is encountered and fired; halting execution at the breakpoint; and displaying a position at which execution halted via a user interface.

Another embodiment provides an article of manufacture containing a program which, when executed performs an operation. The operation comprises: for a plurality of user-selected statements of the code, automatically setting breakpoints on each of the plurality of user-selected statements; allowing the code to execute until a breakpoint set on a first encountered statement of the plurality of user-selected statements is encountered and fired; halting execution at the breakpoint; and displaying a position at which execution halted via a user interface.

In yet another embodiment a computer comprises a display device, a processor in communication with the display device, and a memory device in communication with the processor and containing at least code to be debugged and a debugger program. The debugger program comprises a user interface configured to render a screen on the display device from which a user may select a plurality of statements of the code and then request a run-to function, whereby breakpoints are set on each statement of the selected plurality of statements. The debugger program then configures the processor to halt subsequent execution of the code when a breakpoint set on a first encountered statement of the plurality of user-selected statements is encountered and fired.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is one embodiment of a user interface screen illustrating a user-implemented extended run-to function for a group of selected statements;

FIG. 5 is one embodiment of a breakpoint table;

DETAILED DESCRIPTION OF THE PREFERRED EMBODIMENTS

The present invention provides methods, apparatus and articles of manufacture for implementing a run-to function for a selected code portion. The selected code portion may generally comprise a statement or any grouping of statements. In one embodiment, the code portion comprises at least two individual user-selected statements. That is, the user directly selects two or more statements from a listing of statements (e.g., in a source code panel of a graphical user interface). In another embodiment, the code portion comprises one of a variety of program packaging constructs selected by a user from a list. Illustrative program packaging constructs include, for example, a program, a module, a class and a routine/method. The selected program packaging construct may have one or more statements.

One embodiment of the invention is implemented as a program product for use with a computer system such as, for example, the computer 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
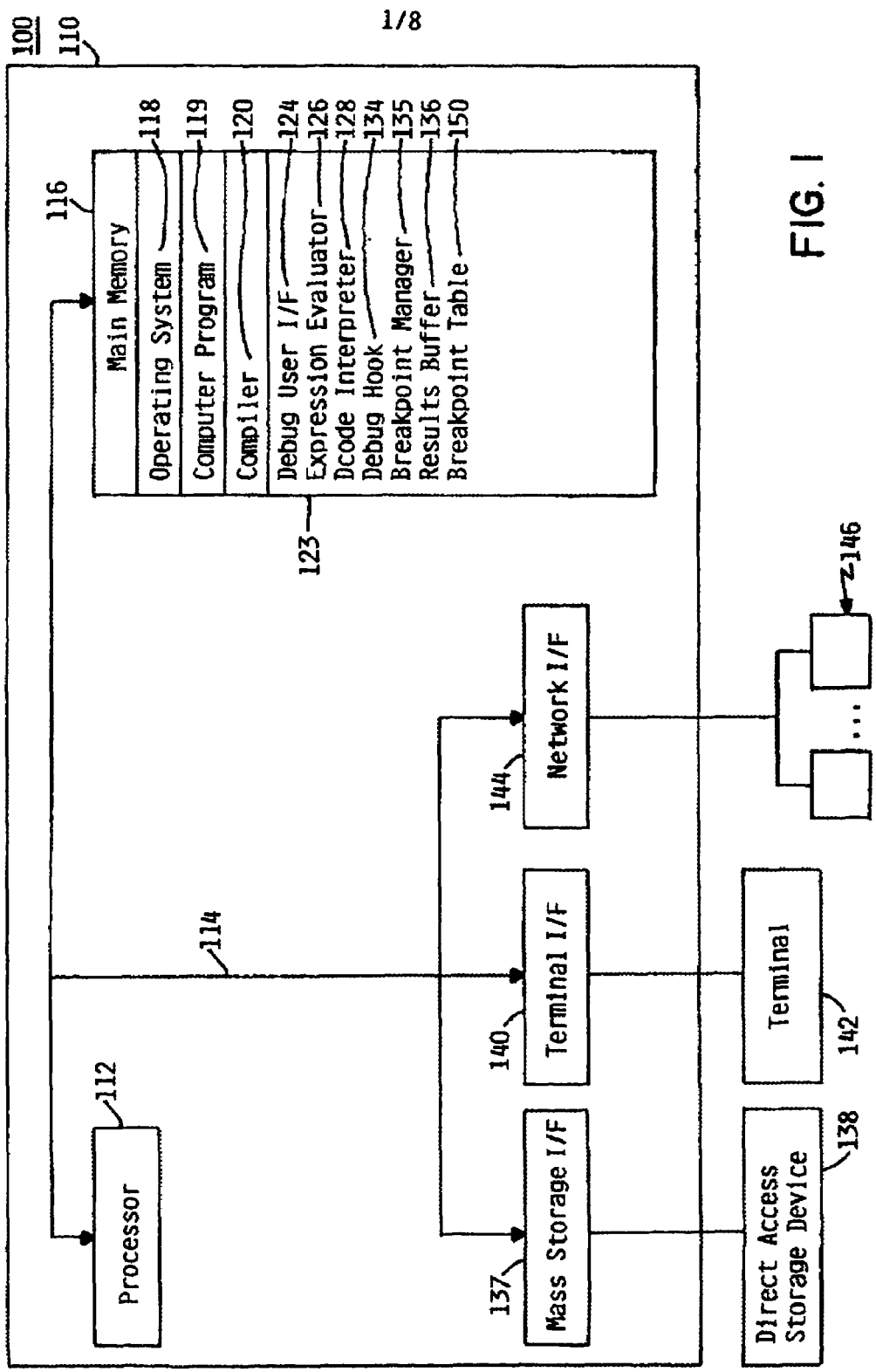
FIG. 1 is a high-level diagram of one embodiment of a computer.

Referring now to FIG. 1, a computing environment 100 is shown. In general, the distributed environment 100 includes a computer system 110 and a plurality of networked devices 146. For simplicity, only the details of the computer system 110 are shown. However, it is understood that the computer system 110 may be representative of one or more of the networked devices 146. In general, computer system 110 and the networked devices 146 could be any type of computer, computer system or other programmable electronic device, including desktop or PC-based computers, workstations, network terminals, a client computer, a server computer, a portable computer, an embedded controller, etc.

Although shown networked into a larger system, the computer system 110 may be a standalone device. Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiment may also be practiced in distributed computing environments in which tasks are performed by remote processing devices that are linked through a communications network. In a distributed computing environment, program modules may be located in both local and remote memory storage devices. In this regard, the computer system 110 and one or more of the networked devices 146 may be thin clients which perform little or no processing. In a particular embodiment, the computer system 110 is an eServer iSeries 400 computer available from International Business Machines, Corporation of Armonk, N.Y.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions, or operation codes, (also known as opcodes), and data via a bus 114 from a main memory 116. The processor 112 could be any processor adapted to support the debugging methods, apparatus and article of manufacture of the invention. In particular, the computer processor 112 is selected to support the debugging features of the present invention. Illustratively, the processor is a PowerPC available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 114.

As shown, the main memory 116 generally includes an operating system 118, a computer program 119, a compiler 120 and debugger program (the debugger) 123. The operating system may be any suitable operating system such as OS/400. The computer program 119 represents any code that is to be examined, edited, compiled and/or debugged. In one embodiment, the debugger 123 is a graphical user interface system debugger for the eServer iSeries computer. OS/400 and eServer iSeries are available from International Business Machines, Corporation of Armonk, N.Y.

Although the software constructs, such as the computer program 119 and the debugger 123, are shown residing on the same computer, a distributed environment is also contemplated. Thus, for example, the debugger 123 may be located on a networked device 146, while the computer program 119 to be debugged is on the computer system 110.

In a specific embodiment, the debugger 123 comprises a debugger user interface 124, expression evaluator 126, Dcode interpreter 128 (also referred to herein as the debug interpreter 128), debugger hook (also known as a stop handler) 134, a breakpoint manager 135, a results buffer 136 and a breakpoint table 150. Although treated herein as integral parts of the debugger 123, one or more of the foregoing components may exist separately in the computer system 110. Further, the debugger may include additional components not shown.

Figure 2:
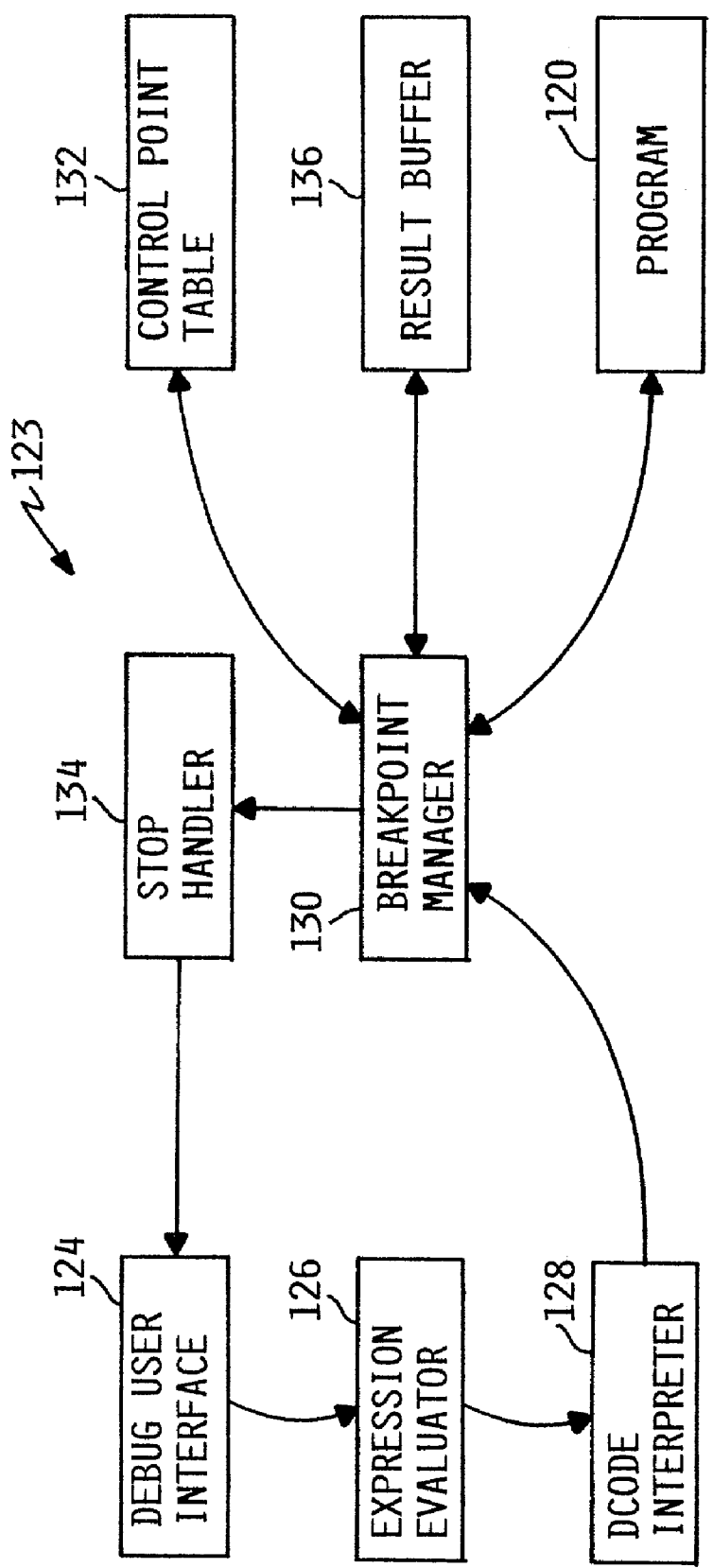
FIG. 2 is a block diagram illustrating the operation of a debugger.

An illustrative debugging process is now described with reference to FIG. 2. A debugging process is initiated by the debug user interface 124. The user interface 124 presents the program under debugging and highlights the current line of the program on which a stop or error occurs. The user interface 124 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross-referenced. In the embodiments of the invention, the debug user interface 124 also allows a user to select a code portion(s) and implement a run-to function with respect to the selected code portion(s). In such a context, the run-to function is referred to herein as an "extended run-to function". Illustrative embodiments of the user interface 124 for setting extended run-to functions are described with reference to FIGS. 3–4.

The expression evaluator 126 parses the debugger command passed from the user interface 124 and uses a data structure (e.g., a table) generated by the compiler 120 to map the line number in the debugger command to the physical memory address in memory 116. In addition, the expression evaluator 126 generates a Dcode program for the command. The Dcode program is machine executable language that emulates the commands. Some embodiments of the invention include Dcodes which, when executed, activate control features described in more detail below.

The Dcode generated by the expression evaluator 126 is executed by the Dcode interpreter 128. The interpreter 128 handles expressions and Dcode instructions to perform various debugging steps. Results from Dcode interpreter 128 are returned to the user interface 124 through the expression evaluator 126. In addition, the Dcode interpreter 128 passes on information to the debug hook 134, which takes steps described below.

After the commands are entered, the user provides an input that resumes execution of the program 120. During execution, control is returned to the debugger 123 via the debug hook 134. The debug hook 134 is a code segment that returns control to the appropriate user interface. In some implementations, execution of the program eventually results in an event causing a trap to fire (e.g., a breakpoint or watchpoint is encountered). Inserting and managing special op codes that cause these traps to fire is the responsibility of the breakpoint manager 235. When a trap fires, control is then returned to the debugger by the debug hook 134 and program execution is halted. The debug hook 134 then invokes the debug user interface 124 and may pass the results to the user interface 124. Alternatively, the results may be passed to the results buffer 136 to cache data for the user interface 124. In other embodiments, the user may input a command while the program is stopped, causing the debugger to run a desired debugging routine. Result values are then provided to the user via the user interface 124.

Figure 3:
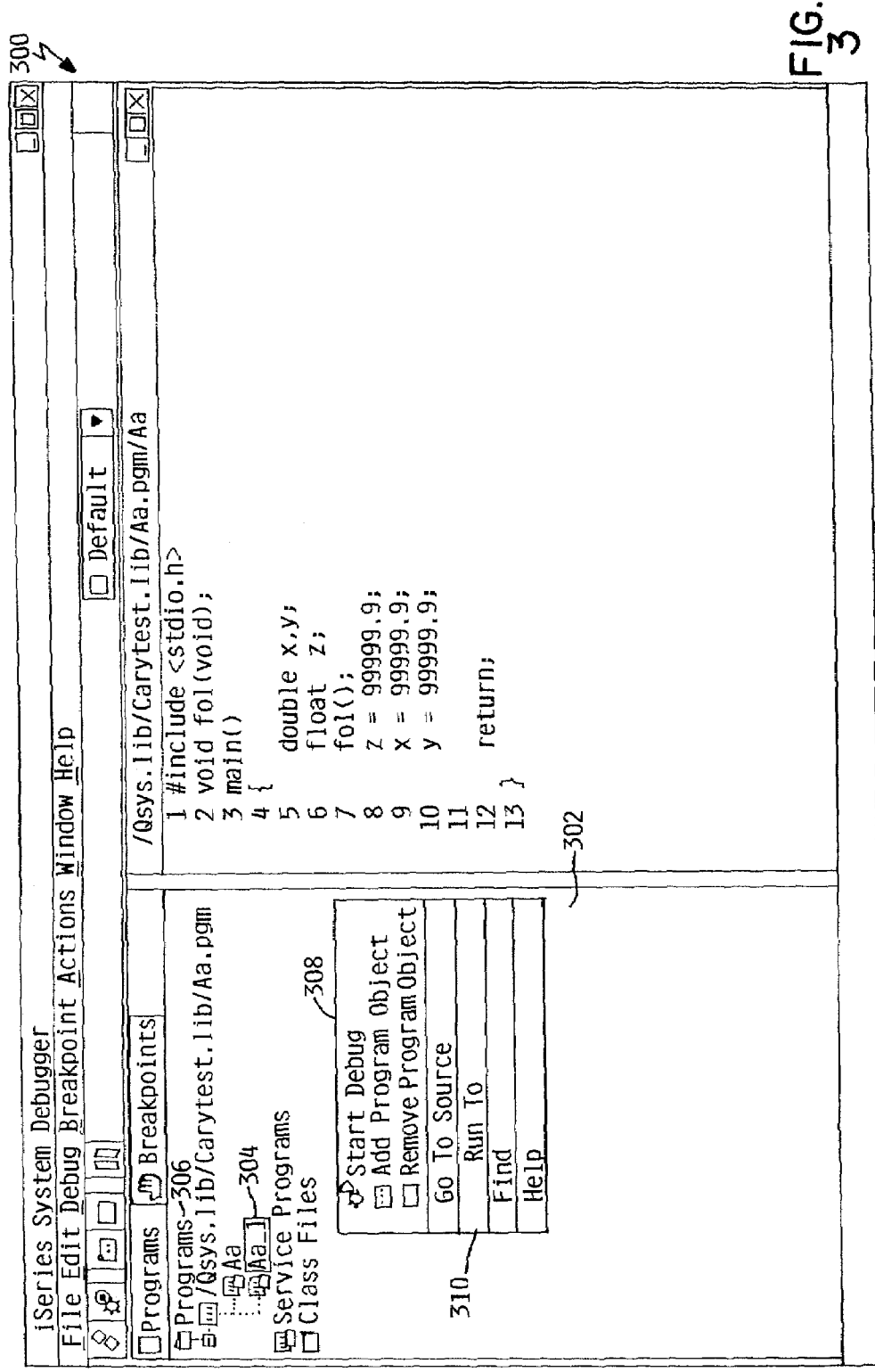
FIG. 3 is one embodiment of a user interface screen illustrating a user-implemented extended run-to function for a selected module.

Referring now to FIGS. 3–4 one embodiment of the user interface 124 for setting extended run-to functions is shown. In general, an extended run-to function may be implemented for any combination of statements, referred to herein as a code portion. In one embodiment, the code portion may be a logical grouping of code (also referred to herein as program packaging constructs) such as, for example, a program, a module, a class and a method. In another embodiment, the code portion may be any user-selected grouping of individual statements, whether or not logically related in a programmatic sense. Referring first to FIG. 3 a user interface screen 300 of the user interface 124 is shown in which a user has selected a module 304 of a program 306 (shown in a program panel 302). A menu 308 is then invoked from which a "Run To" menu item 310 is selected to implement an extended run-to function. The menu 308 may be accessed in any variety of ways, including right-clicking a mouse after the module 304 has been selected. FIG. 4 is a user interface screen 400 of the user interface 124 in which a user has selected a group of statements 404 shown in a source code panel 402. Again, the extended run-to function is implemented for the selected code portion by selecting a "Run To" menu item 406 from a menu 408.

In one embodiment, the inventive extended run-to function is implemented by setting breakpoints whose location is recorded in the breakpoint table 150. One embodiment of the breakpoint table 150 is shown in FIG. 5. In general, the breakpoint table 150 provides some aspects which are well-known in the art in combination with some inventive features. For example, as is well-known, an address column 502 and an op code (operation code) column 504 are shown. The information contained under the address column 502 specifies a memory address of a breakpoint. The information contained under the op code column 504 specifies the original operation code of the program which has been replaced with some "bad" operation code. The breakpoints specified may be breakpoints used to implement well-known functions or to implement the extended run-to function of the invention. For purposes of distinguishing the breakpoint types, the breakpoints used to implement the extended run-to function of the invention are referred to herein as "internal breakpoints". The type of breakpoint is determined by a flag set in an extended run-to column 506. For example, where a user selects the module 304 of the program 306 as shown in FIG. 3, a record for each statement in the module 304 is created in which each respective flag in the extended run-to column 506 is set to ON. In an alternative embodiment, an internal breakpoint is set on each entry point to each routine in the module 304. The entry points may be determined by the compiler 120 (FIG. 1) as is well-known.

Figure 6:
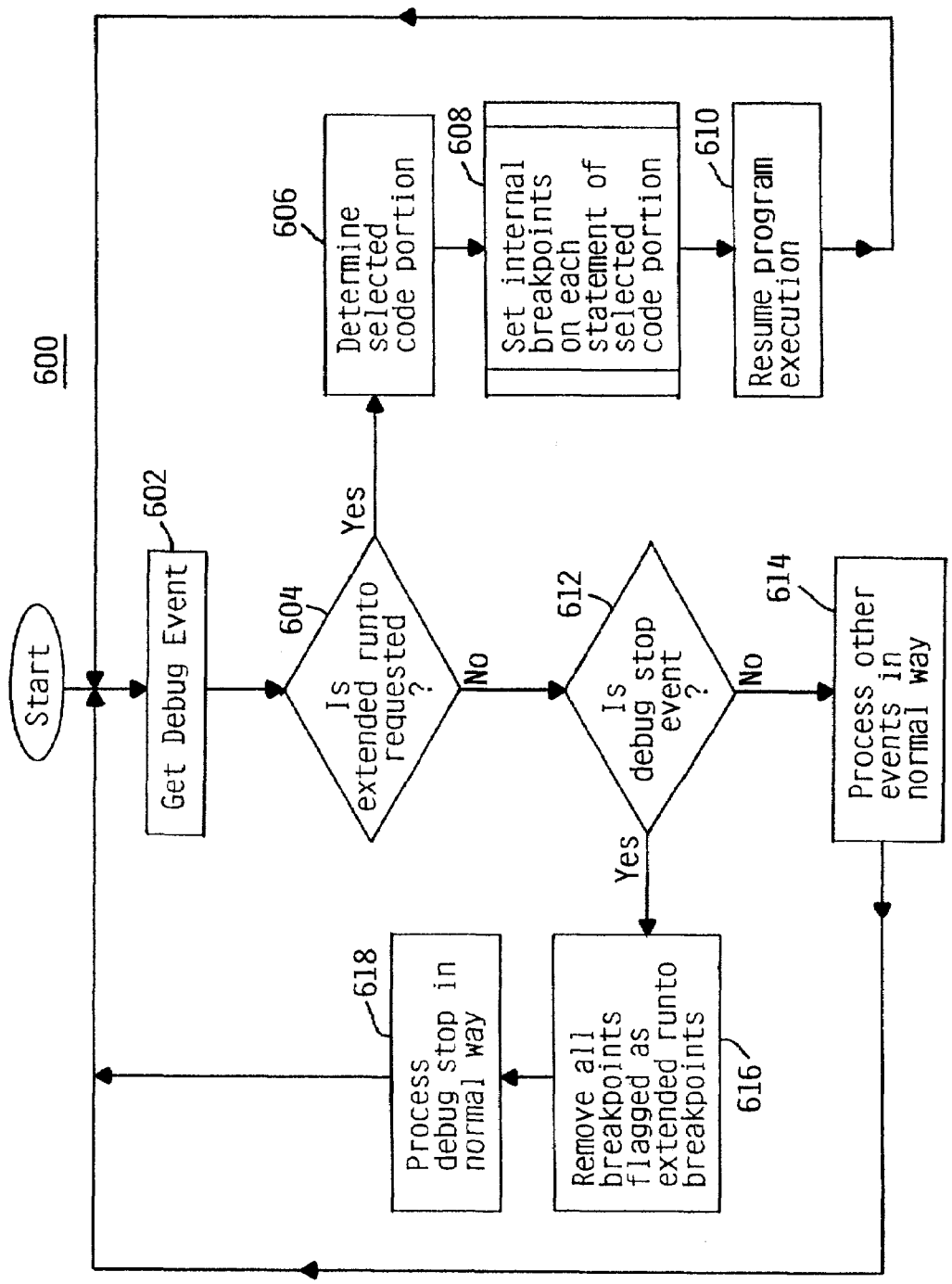
FIG. 6 is one embodiment of a method illustrating the operation of a debugger program.

Referring now to FIG. 6, a method 600 of operating the debugger 123 in a manner consistent with embodiments of the present invention is shown. Upon receiving a debug event (step 602) the debugger 123 determines whether the event is an extended run-to function request (step 604). If so, the debugger 123 determines the selected code portion (step 606). As described above, the selected code portion may be, for example, some defined packaging construct (such as a program, module, class or routine) or some group of individually selected statements. After determining the selected code portion, the debugger 123 sets internal breakpoints on each statement of the selected code portion (step 610). The debugger 123 then waits for the next event.

Returning to step 604, if the debug event is not an extended run-to request, the debugger 123 determines (at step 612) whether the event is a debug stop event (i.e., any event which gives the debugger 123 control). If step 612 is answered negatively, the event is handled in an appropriate way (step 614), after which the debugger 123 waits for the next debug event. If, however, the event is a debug stop event, all internal breakpoints are removed (step 616). In the present invention, a debug stop event includes the first encounter with a breakpoint of a statement of the selected code portion. For example, if a user implemented an extended run-to function for a selected module (such as in FIG. 3), then a debug stop event occurs upon the first encounter with a statement (or more particularly, with the associated breakpoint of that statement) of the selected module. The event is then processed in the appropriate manner according to the design of the debugger 123 (step 618), after which the debugger waits for the next debug event.

Figure 7A:
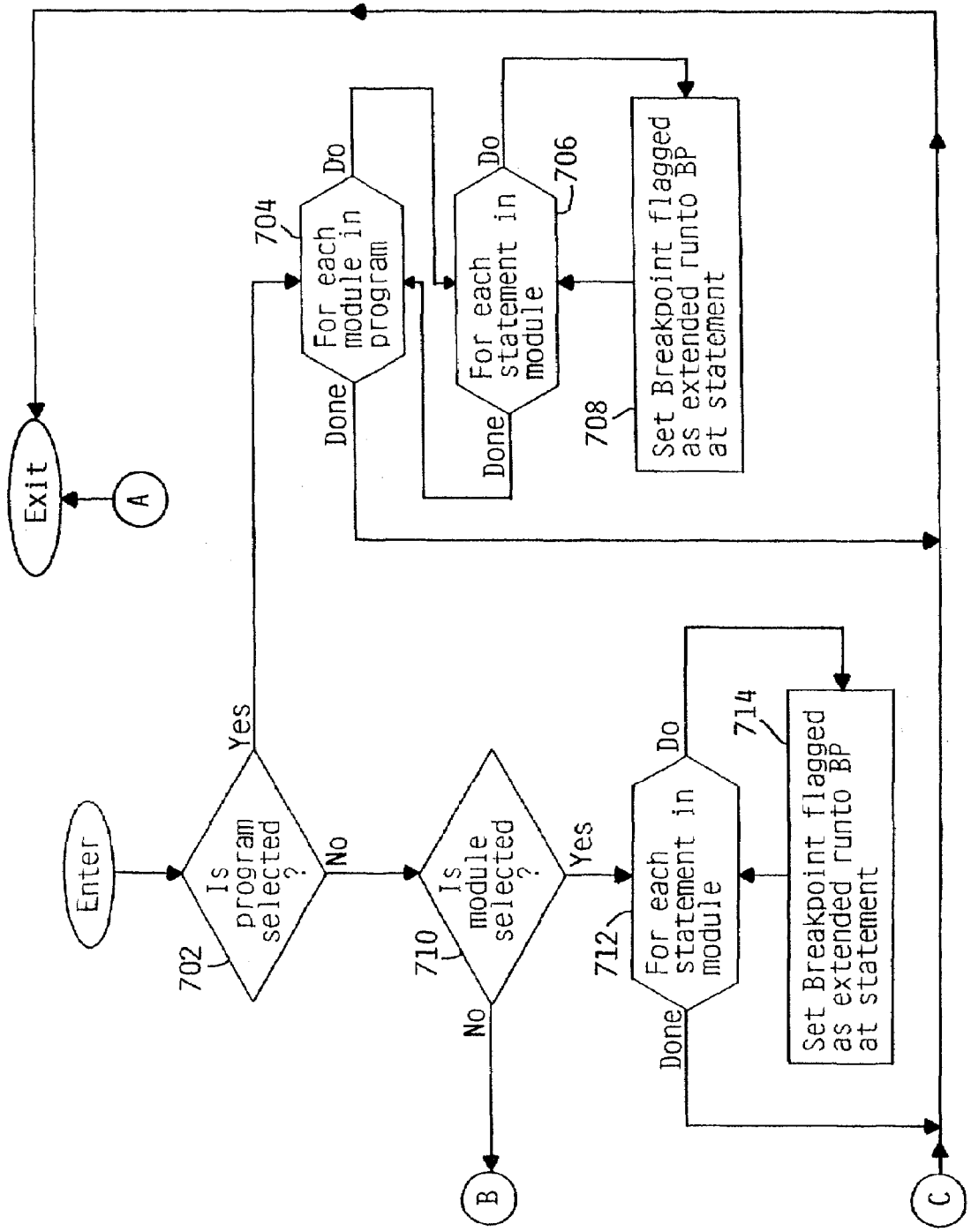
FIGS. 7A–B is one embodiment of a method illustrating the operation of a debugger program in setting internal breakpoints on statements of a selected code portion.
Figure 7B:
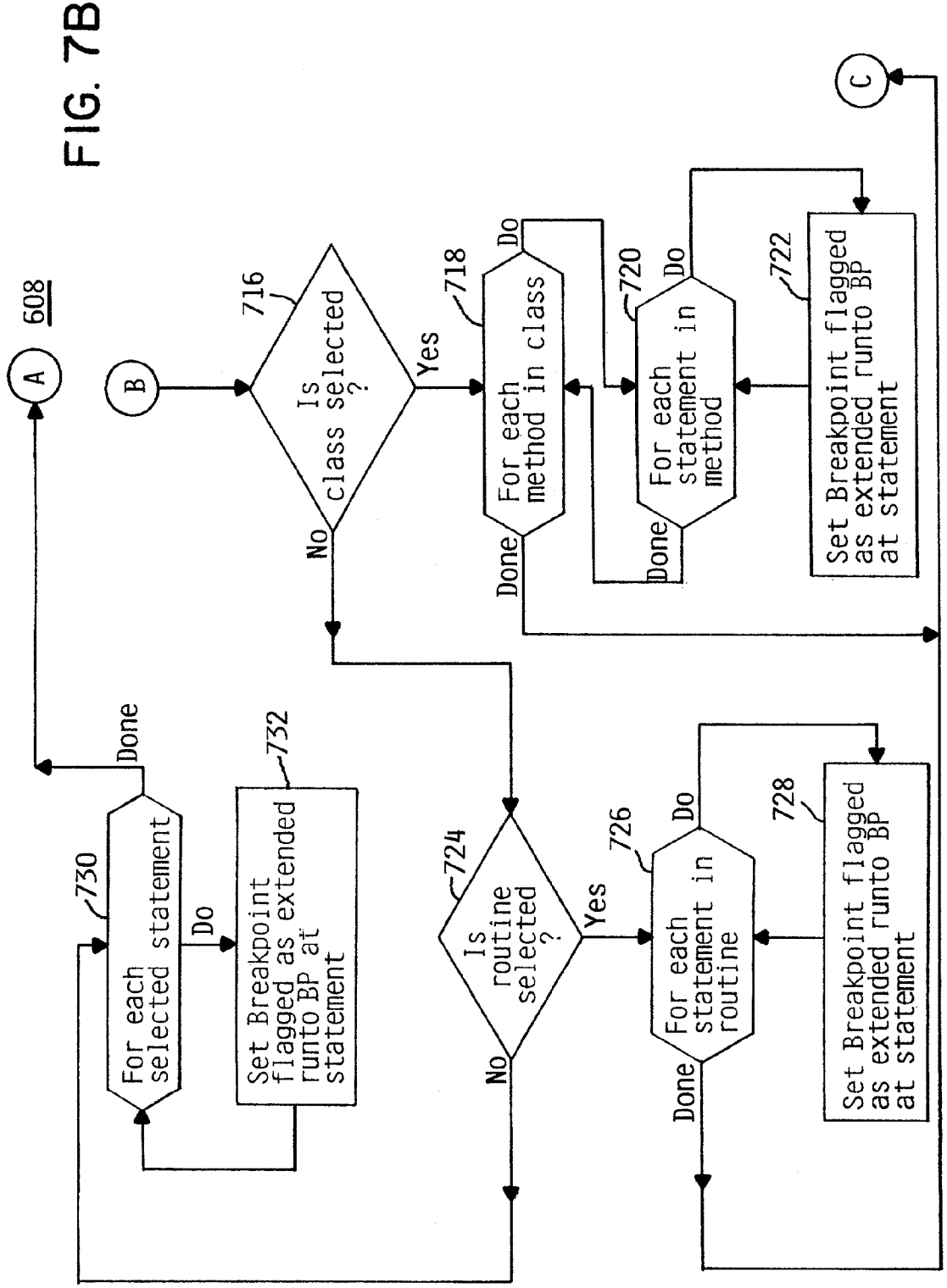

One embodiment illustrating the operation of step 608 is shown in FIG. 7. In general, the processing performed at step 608 includes a determination of where internal breakpoints are to be set according to the selected code portion. Accordingly, at step 702, the debugger 123 determines whether a program has been selected by the user. If so, then an internal breakpoint is set on each statement of each module of the selected program (steps 704–708). If a program has not been selected, the debugger 123 determines whether a module has been selected by the user (step 710). If so, an internal breakpoint is set on each statement of the selected module (steps 712–714). If a module has not been selected, the debugger 123 determines whether a class has been selected (step 716). If so, an internal breakpoint is set on each statement of each method within the selected class (steps 718–722). If a class has not been selected, the debugger 123 determines whether a routine has been selected (step 724). If so, an internal breakpoint is set on each statement of the selected routine (steps 726–728). If a routine has not been selected, then, according to some embodiments, it follows that the user has selected a group of individual statements. Accordingly, internal breakpoints are set at each of the selected statements (steps 730–732). Once internal breakpoints have been set at each of the appropriate statements the program resumes execution (step 610, FIG. 6).

While the foregoing is directed to embodiments of the present invention, other and further embodiments of the invention may be devised without departing from the basic scope thereof, and the scope thereof is determined by the claims that follow.

What is claimed is:

1. A method of debugging code using a debugging program, comprising:
    for a plurality of user-selected statements of the code, automatically setting breakpoints on each of the plurality of user-selected statements, wherein automatically setting breakpoints on each of the plurality of user-selected statements is done in response to a user selection of an extended run-to function;
    executing the code until a breakpoint set on a first encountered statement of the plurality of user-selected statements is encountered and fired;
    halting execution at the breakpoint; and
    displaying a position at which execution halted via a user interface.

2. The method of claim 1, further comprising, removing all the breakpoints set on each of the plurality of user-selected statements upon encountering and firing the breakpoint.

3. The method of claim 1, wherein the user-selected statements define a program selected from a list of programs in the user interface and wherein automatically setting breakpoints on each of the plurality of user-selected statements comprises setting breakpoints on each statement of the program.

4. The method of claim 1, wherein the user-selected statements define a module selected from a list of modules in a user interface and wherein automatically setting breakpoints on each of the plurality of user-selected statements comprises setting breakpoints on each statement of the module.

5. The method of claim 1, wherein the user-selected statements define a class selected from a list of classes in a user interface and wherein automatically setting breakpoints on each of the plurality of user-selected statements comprises setting breakpoints on each statement of the class.

6. The method of claim 1, wherein the user-selected statements define a routine selected from a list of routines in a user interface and wherein automatically setting breakpoints on each of the plurality of user-selected statements comprises setting breakpoints on each statement of the routine.

7. The method of claim 1, wherein the user-selected statements are selected from a source code window of a user interface.

8. The method of claim 1, wherein the plurality of user-selected statements define a logical grouping of statements.

9. The method of claim 8, wherein the logical grouping of statements is selected from one of a program, a module, a class and a routine.

10. A computer readable storage medium containing a debugger program which, when executed, performs an operation, comprising:
    for a plurality of user-selected code statements, automatically setting breakpoints on each of the plurality of user-selected statements, wherein automatically setting breakpoints on each of the plurality of user-selected statements is done in response to a user selection of an extended run-to function;
    allowing the code to execute until a breakpoint set on a first encountered statement of the plurality of user-selected statements is encountered and fired;
    halting execution at the breakpoint; and
    displaying a position at which execution halted via a user interface.

11. The computer readable storage medium of claim 10, further comprising, removing all the breakpoints set on each of the plurality of user-selected statements upon encountering and firing the breakpoint.

12. The computer readable storage medium of claim 10, wherein the user-selected statements define a program selected from a list of programs in the user interface and wherein automatically setting breakpoints on each of the plurality of user-selected statements comprises setting breakpoints on each statement of the program.

13. The computer readable storage medium of claim 10, wherein the user-selected statements define a module selected from a list of modules in a user interface and wherein automatically setting breakpoints on each of the plurality of user-selected statements comprises setting breakpoints on each statement of the module.

14. The computer readable storage medium of claim 10, wherein the user-selected statements define a class selected from a list of classes in a user interface and wherein automatically setting breakpoints on each of the plurality of user-selected statements comprises setting breakpoints on each statement of the class.

15. The computer readable storage medium of claim 10, wherein the user-selected statements define a routine selected from a list of routines in a user interface and wherein automatically setting breakpoints on each of the plurality of user-selected statements comprises setting breakpoints on each statement of the routine.

16. The computer readable storage medium of claim 10, wherein the user-selected statements are selected from a source code window of a user interface.

17. The computer readable storage medium of claim 10, wherein the plurality of user-selected statements define a logical grouping of statements.

18. The computer readable storage medium of claim 17, wherein the logical grouping of statements is selected from one of a program, a module, a class and a routine.

19. A computer, comprising:
- a display device;
- a processor in communication with the display device; and
- a memory device in communication with the processor and containing at least code to be debugged and a debugger program comprising a user interface configured to render a screen on the display device from which a user may select a plurality of statements of the code and then request an extended run-to function, whereby breakpoints are set on each statement of the selected plurality of statements; and wherein the debugger program configures the processor to halt subsequent execution of the code when a breakpoint set on a first encountered statement of the plurality of user-selected statements is encountered and fired.

20. The computer of claim 19, wherein the processor is configured to remove all breakpoints set in the code upon firing the breakpoint set on the first encountered statement.

* * * * *